United States Patent [19]
Berg et al.

[11] Patent Number: 5,757,587
[45] Date of Patent: May 26, 1998

[54] DIRECT ACCESS STORAGE DEVICE HAVING A DISK MOTION LIMITER FOR PREVENTING DISK DATA ZONE AND SPINDLE BEARING DAMAGE

[75] Inventors: Lowell James Berg, Rochester; Jeffrey Fred Boigenzahn, Pine Island; Zine-Eddine Boutaghou; Todd Phillip Fracek, both of Rochester, all of Minn.

[73] Assignee: International Business Machines Corporation, Armonk, N.Y.

[21] Appl. No.: 661,339

[22] Filed: Jun. 12, 1996

Related U.S. Application Data

[63] Continuation of Ser. No. 324,300, Oct. 17, 1994, abandoned.
[51] Int. Cl.$^6$ .................................. G11B 5/54; G11B 17/00
[52] U.S. Cl. .................................. 360/105; 360/97.01
[58] Field of Search .................................. 360/105, 133, 360/97.01–97.02, 97.03

[56] References Cited

U.S. PATENT DOCUMENTS

| | | | |
|---|---|---|---|
| 4,369,457 | 1/1983 | Ho et al. | 360/97.02 |
| 4,583,213 | 4/1986 | Bracken et al. | 369/261 |
| 4,605,125 | 8/1986 | James | 206/312 |
| 4,802,049 | 1/1989 | Tanaka et al. | 360/133 |
| 4,803,678 | 2/1989 | Tanaka et al. | 360/133 X |
| 4,853,926 | 8/1989 | Covington et al. | 360/133 X |
| 4,863,031 | 9/1989 | Tanaka et al. | 360/133 X |
| 4,939,611 | 7/1990 | Connolly | 360/128 |
| 5,034,837 | 7/1991 | Schmitz | 360/105 |
| 5,095,395 | 3/1992 | Wakatski | 360/105 |
| 5,189,574 | 2/1993 | Imamura et al. | 360/103 |
| 5,212,679 | 5/1993 | Tohkairin | 360/97.03 |
| 5,231,549 | 7/1993 | Morehouse et al. | 360/105 X |
| 5,239,431 | 8/1993 | Day et al. | 360/105 X |
| 5,272,580 | 12/1993 | Hickox et al. | 369/97.02 |
| 5,296,985 | 3/1994 | Mochizuki et al. | 360/105 |
| 5,313,350 | 5/1994 | Dion | 360/97.01 |
| 5,422,770 | 6/1995 | Alt | 360/105 |
| 5,453,889 | 9/1995 | Alt | 360/97.01 |

FOREIGN PATENT DOCUMENTS

| | | | |
|---|---|---|---|
| 56-137559 | 10/1981 | Japan | 369/97.03 |
| 60-246077 | 12/1985 | Japan | 369/258 |
| 62-88195 | 4/1987 | Japan | 369/97.02 |
| 62-172558 | 7/1987 | Japan | 369/270 |
| 4-268279A | 9/1992 | Japan | 369/258 |
| 4-289577 | 10/1992 | Japan | 369/258 |
| 5-182347 | 7/1993 | Japan | 360/137 |

OTHER PUBLICATIONS

B. W. McGinnis, "Flexible Disc/Pack Stabilization", IBM Technical Disclosure Bulletin, vol. 17, no. 1, Jun. 1974, p. 326.

*Primary Examiner*—John H. Wolff
*Attorney, Agent, or Firm*—Matthew J. Bussan; Michael F. Hoffman

[57] ABSTRACT

A direct access storage device (DASD) includes a plurality of motion limiters and/or a continuous motion limiter projecting from at least one of the base and cover, each motion limiter having faces disposed in close proximity to and confronting opposite surfaces of a data storage disk adjacent a peripheral portion of the disk that does not contain data. Preferably, the motion limiters are disposed at several points about the periphery of the disk, and may be incorporated in a load/unload ramp and/or side rails of the DASD. The faces of the motion limiters are disposed relative to the disk so that when the DASD is subjected to an acceleration, the disk contacts at least one of the faces only at the peripheral portion of the disk, outside the data zone. Accordingly, the motion limiters prevent data zone and spindle bearing damage when the DASD is dropped.

15 Claims, 7 Drawing Sheets

DIRECT ACCESS STORAGE DEVICE HAVING A DISK MOTION LIMITER FOR PREVENTING DISK DATA ZONE AND SPINDLE BEARING DAMAGE

This application is a continuation, of application Ser. No. 08/324,300, filed Oct. 17, 1994, now abandoned.

BACKGROUND OF THE INVENTION

1. Field of the Invention

The present invention relates to motion limiters in a Direct Access Storage Device (DASD) and, in particular, motion limiters for preventing data zone and spindle bearing damage.

2. Description of the Related Art

Personal Computer Memory Card International Association (PCMCIA) standard Direct Access Storage Devices (DASDs) are inseitable into slots in computers, particularly laptop and notebook computers, where component size is a very significant design factor.

PCMCIA standard handling specifications require that products (including disk drives) be able to withstand drops onto very hard surfaces. For example, the PCMCIA specification requires that a disk drive be able to survive a 30-inch drop without data loss. This drop converts a significant amount of potential energy into kinetic energy. The abrupt stop upon impact converts the kinetic energy into very high deceleration forces which may exceed the forces which the PCMCIA DASD components may accommodate. Experiments indicate that a 30-inch drop onto hard vinyl can transmit acceleration forces of over 1,200 g to the internal structures of a PCMCIA DASD. Accordingly, due to the reduced size of the disk drive, the PCMCIA DASD is more delicate and may be more susceptible to damage upon impact.

The rigid structure of the PCMCIA DASD necessary to meet the bending and twisting requirements of the PCMCIA specifications in combination with the relatively hard surface of a vinyl clad cement floor results in a very short duration acceleration pulse—on the order of 0.5 ms. The high deceleration forces and short duration impact can excite the internal components in a PCMCIA DASD and put great mechanical stress on these internal components.

Of particular concern is the motion of the data storage disk normal to its plane. Though relatively rigid, the data storage disk is nonetheless a flexible structure whose first two natural frequencies are each under about 2 kHz for a standard 48 mm disk, and each under about 1 kHz for a standard 65 mm disk. Structures with these natural frequencies will be strongly excited by 0.5 ms acceleration pulses.

As a DASD is dropped, energy is transferred from the base to the data storage disk through the spindle bearings. The energy is roughly proportional to the amplitude of resultant motion of the data storage disk, and also related to the stresses at the ball/race interface of the spindle bearings. Large amplitude deflections of the data storage disk cause large stresses between the balls and races, and can lead to premature spindle bearing failure.

The use of the PCMCIA DASD in laptop and notebook size computers suggests a high probability of DASD impacts as a result of being dropped. The impacts can partially result from any rough handling of the computer device itself. Additionally, the impact forces could come from dropping the disk drive itself at a time when the DASD is not installed in the computer housing. The problem becomes worse as data storage disks and actuator arms become thinner. If an actuator arm is allowed to hit the data storage disk in a data zone, hard errors can occur.

U.S. Pat. No. 4,939,611, issued Jul. 3, 1990 to Connolly, proposes the use of vertical displacement limit stops on work function members in a disk drive for preventing disk surface damage. The vertical displacement limit stops are provided on work function members, such as air vanes and actuator arms. When the actuator is in a locked position, the vertical displacement limit stops prevent contact of the work function members with adjacent track surfaces of the data storage disks in the presence of shock forces as high as 105 g, acting over a time interval of 3 ms. The vertical displacement limit stops disclosed in the Connolly patent are inadequate to prevent data zone, actuator arm and spindle bearing damage during the 30-inch drop required by the PCMCIA specification, however. Because vertical displacement limit stops are mounted on the actuator arms, the actuator arms can be damaged by the 30-inch drop required by the PCMCIA specification, resulting in data loss due to track misregistration. Additionally, because vertical displacement limit stops are mounted on the actuator arms, contact between the data storage disk and the actuator arms is only prevented when the actuator arm is in the locked position. This is disadvantageous because impacts also can occur when the actuator is in an unlocked position. Further, vertical displacement limit stops are only disposed on work function members, and thus do not prevent spindle bearing damage from occurring during the 30-inch drop required by the PCMCIA specification.

SUMMARY OF THE INVENTION

It is an object of the present invention to provide an enhanced DASD for shock protection.

It is another object of the present invention to provide a DASD that protects the data zone and actuator arm from damage when subjected to acceleration forces over 1,200 g, acting over a time interval of 0.5 ms.

It is a further object of the present invention to provide a DASD that protects spindle bearings from damage when subjected to acceleration forces over 1,200 g, acting over a time interval of 0.5 ms.

It is a still further object of the present invention to provide a DASD that protects a data zone, actuator arm and spindle bearings from damage when subjected to acceleration forces, without requiring the actuator to be in a locked position.

These and other objects are achieved by the present invention.

In a first embodiment of the present invention, a DASD comprises a data storage disk rotatably mounted about an axis and having first and second opposite surfaces, a data zone on at least one of the first and second surfaces, and a peripheral portion outside the data zone; an actuator for moving a transducer head relative to the data storage disk; a housing enclosing the data storage disk and the actuator, the housing including a base and a cover; a plurality of motion limiters projecting from at least one of the base and cover, each motion limiter having a first face disposed in close proximity to and confronting the first surface of the data storage disk adjacent the peripheral portion and having a second face disposed in close proximity to and confronting the second surface of the data storage disk adjacent the peripheral portion; the first and second faces of one of the motion limiters being disposed on a first side of the actuator, and the first and second faces of another of the motion limiters being disposed on a second side of the actuator opposite the first side; and the first and second faces of the motion limiters being disposed relative to the data storage disk so that when the DASD is subjected to an acceleration the data storage disk contacts at least one of the first and second faces of the motion limiters only at the peripheral portion, outside the data zone. Preferably, one of the motion limiters is a ramp engagable by the actuator to load and unload the transducer onto and from the data storage disk, and another of the motion limiters includes a base boss projecting from the base and a cover boss projecting from the cover, wherein the base and cover bosses respectively include the first and second faces. Also preferably, each of the motion limiters comprises a material forming the first and second faces which is softer than the first and second surfaces of the data storage disk. More preferably, the material is a polymer having a hardness of at least 60 durometers.

In a second embodiment of the present invention, a DASD comprises a data storage disk rotatably mounted about an axis and having first and second opposite surfaces, a data zone on at least one of the first and second surfaces and a peripheral portion outside the data zone; a housing enclosing the data storage disk, the housing including a base, a cover and a pair of side rails disposed along parallel sides of the housing for insertion into a pair of guide slots, each of the side rails including a cutout into which the peripheral portion of the data storage disk is received; a motion limiter in each cutout of the side rails, each motion limiter having a first face disposed in close proximity to and confronting the first surface of the data storage disk adjacent the peripheral portion and having a second face disposed in close proximity to and confronting the second surface of the data storage disk adjacent the peripheral portion; and the first and second faces of each motion limiter being disposed relative to the data storage disk so that when the DASD is subjected to an acceleration the data storage disk contacts at least one of the first and second faces of each motion limiter only at the peripheral portion, outside the data zone. Preferably, a clearance between the first face of each motion limiter and the first surface of the data storage disk and a clearance between the second face of each motion limiter and the second surface of the data storage disk are less than 0.33 mm.

In a third embodiment of the present invention, several motion limiters project from at least one of the base cover, wherein the first and second faces of each of the motion limiters are substantially equally spaced from the first and second faces of each adjacent one of the motion limiters.

In a fourth embodiment of the present invention, a DASD comprises a data storage disk rotatably mounted about an axis and having first and second opposite surfaces, a data zone on at least one of the first and second surfaces, and a peripheral portion outside the data zone; a housing enclosing the data storage disk, the housing including a base and a cover; a motion limiter projecting from at least one of the base and cover, the motion limiter having a first face disposed in close proximity to and confronting the first surface of the data storage disk adjacent the peripheral portion and having a second face disposed in close proximity to and confronting the second surface of the data storage disk adjacent the peripheral portion; the first and second faces of the motion limiter extending at least 90 degrees about a circumference of the data storage disk; and the first and second faces of the motion limiter being disposed relative to the data storage disk so that when the DASD is subjected to an acceleration the data storage disk contacts at least one of the first and second faces of the motion limiter only at the peripheral portion, outside the data zone.

BRIEF DESCRIPTION OF THE DRAWINGS

The present invention together with the above and other objects and advantages can best be understood from the following detailed description of the embodiments of the invention illustrated in the drawings, wherein like reference numerals denote like elements and wherein.

DESCRIPTION OF THE PREFERRED EMBODIMENTS

Figure 1:
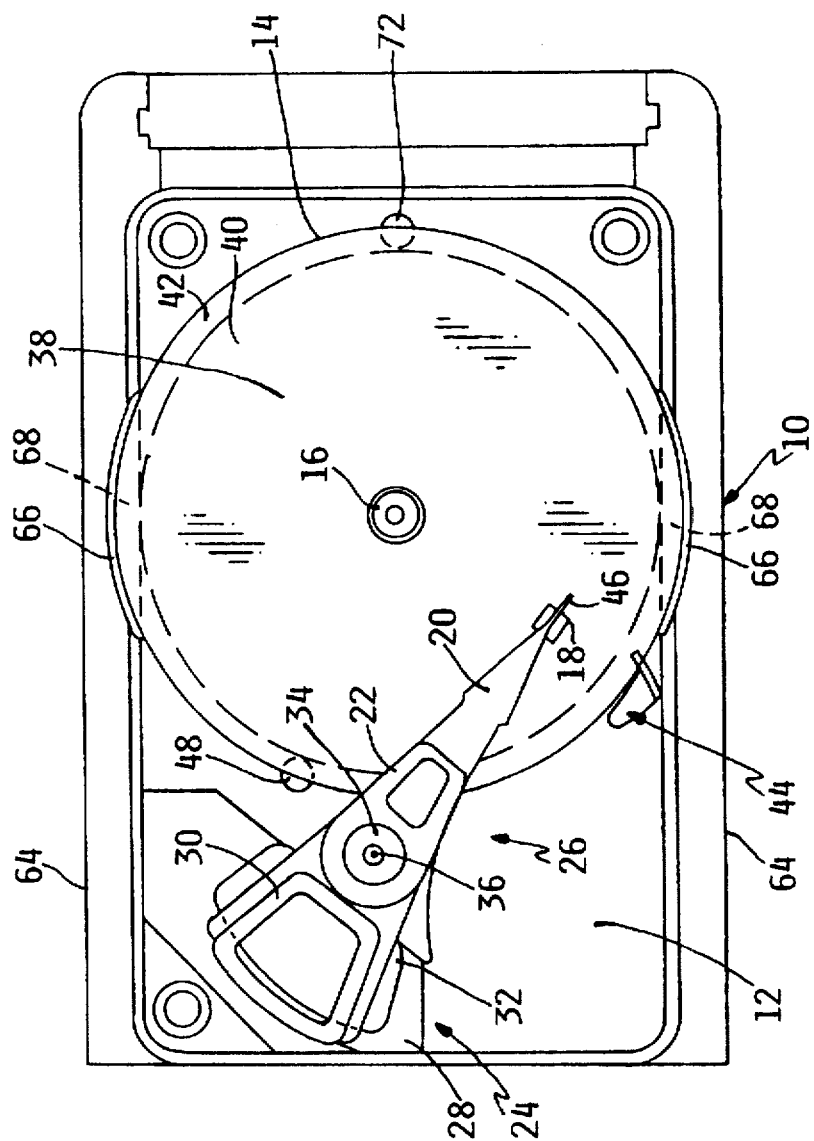
FIG. 1 is a top view of a PCMCIA DASD with its cover removed.

Referring initially to FIG. 1, a PCMCIA DASD 10 is illustrated with its cover removed. A spin motor (not shown), mounted on a base 12, is connected to a data storage disk 14 by conventional spindle bearings (not shown) and hub 16 to rotate data storage disk 14 at high speed. Data storage disk 14 is relatively rigid, i.e., a "hard disk". A transducer head 18 for recording data to and/or reproducing data from data storage disk 14 is mounted on a distal end of a load beam 20. The other end of load beam 20 is attached to an actuator arm 22, which is driven via an actuator motor 24 of an actuator 26. Although not shown in FIG. 1, an identical assembly, i.e., transducer head 18, load beam 20 and actuator arm 22, is driven by actuator motor 24 on the opposite surface of data storage disk 14. The actuator motor 24 includes a pole piece 28 and a similar pole piece (not shown) disposed over opposite sides of a coil 30 attached to actuator arm 22, and in cooperation with a magnet 32, function to drive actuator 26 about bearing 34 and pivot axis 36. Consequently, actuator 26 moves transducer head 18 relative to data storage disk 14 so that transducer head 18 moves in an arc, which extends substantially along a radius of data storage disk 14.

Figure 3:
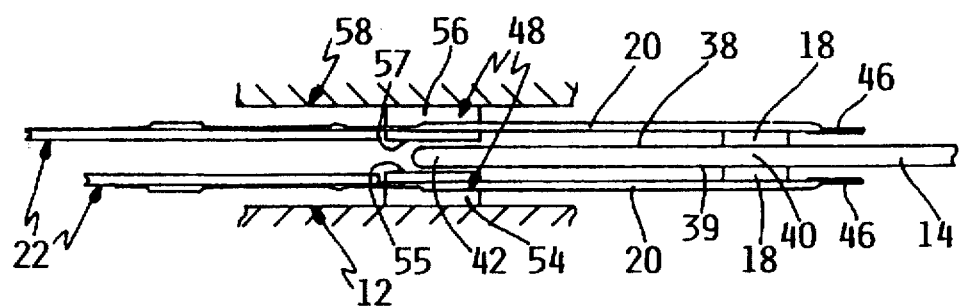
FIG. 3 is a side view illustrating a motion limiter that includes a base boss and a cover boss.

The data storage disk 14 has a surface 38 and an opposite surface 39 (shown in FIG. 3). Data is recorded to and reproduced from a data zone 40 on each of surfaces 38 and 39. Surfaces 38 and 39 also include a peripheral portion 42, outside data zone 40, that does not contain data.

A load/unload ramp 44 is mounted to base 12 and a load/unload tang 46 is mounted on load beam 20. The ramp 44 is disposed so as to be engagable by tang 46 to load and unload transducer head 18 onto and from data storage disk 14 by the driving action of actuator motor 24.

In a first embodiment of the present invention, a motion limiter is provided on each side of actuator 26. Preferably, a first motion limiter is incorporated in load/unload ramp 44 on a first side of actuator 26, and a second motion limiter is provided on a second opposite side of actuator 26 opposite the first side.

Figure 2:
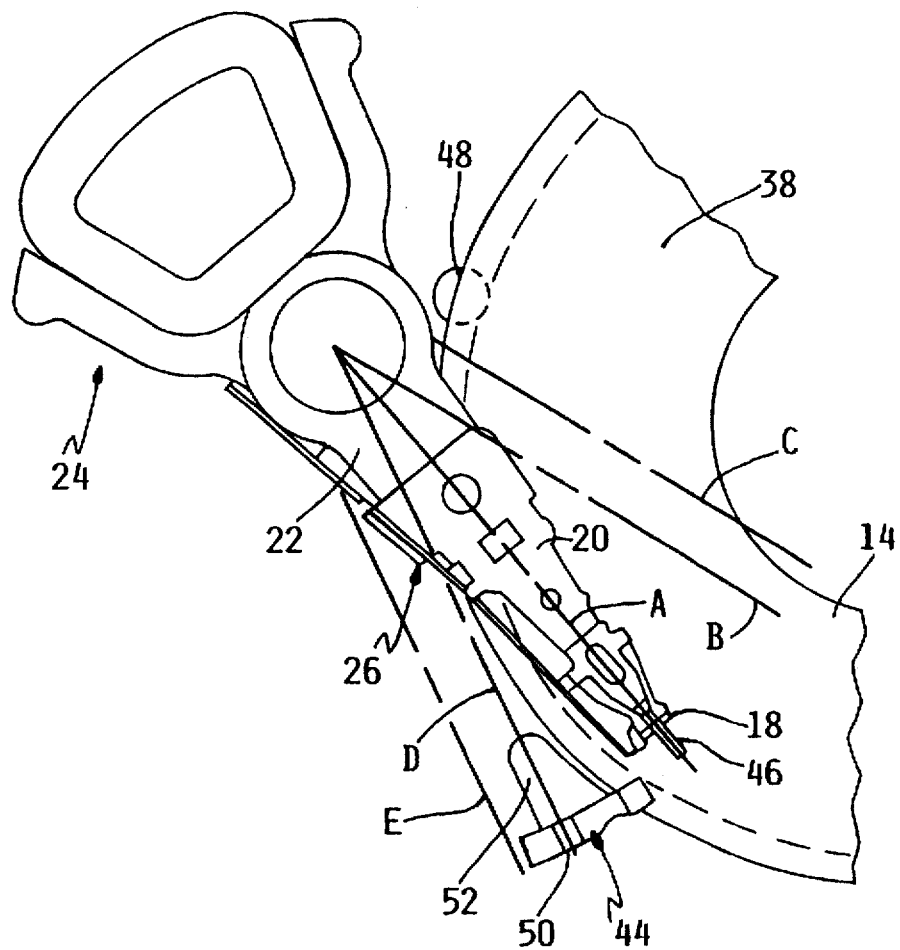
FIG. 2 is an enlarged top view illustrating an actuator portion of the PCMCIA DASD shown in FIG. 1.

This is better illustrated in FIG. 2, which is an enlarged top view of an actuator portion of PCMCIA DASD 10. A center line of load beam 20 is shown in a position A, which is an intermediate position. The center line of load beam 20 travels between a position B and a position D by the driving action of actuator motor 24. When the center line of load beam 20 is in position B, transducer head 18 is positioned over an inner-most portion of data zone 38, and an edge of actuator arm 22 and load beam 20 is in a position C. A motion limiter 48 is disposed outside position C, so as not to restrict the motion of actuator arm 22. When the center line of load beam 20 is located in position D, load/unload tang 46 is engaged in a detent 50 of load/unload ramp 44, and transducer head 18 rests upon a slider protection blade 52 of load/unload ramp 44. Also, when the center line of load beam 20 is in position D, an edge of actuator arm 22 and load beam 20 is in a position E.

Referring to FIG. 3, motion limiter 48 is shown in greater detail in side view. Motion limiter 48 includes a base boss 54 projecting from base 12, and a cover boss 56 projecting from a cover 58. Cover 58 together with base 12 form a housing of PCMCIA DASD 10. Base boss 54 has a face 55 disposed in close proximity to and confronting surface 39 of data storage disk 14 adjacent peripheral portion 42. Likewise, cover boss 56 has a face 57 disposed in close proximity to and confronting surface 38 of data storage disk 14 adjacent peripheral portion 42. When DASD 10 is subjected to an acceleration, data storage disk 14 contacts at least one of faces 55 and 57 only at the peripheral portion 42, outside data zone 40.

Alternatively, bosses 54 and 56 may commonly project from base 12 or cover 58, rather than from both base 12 and cover 58.

Figure 4:
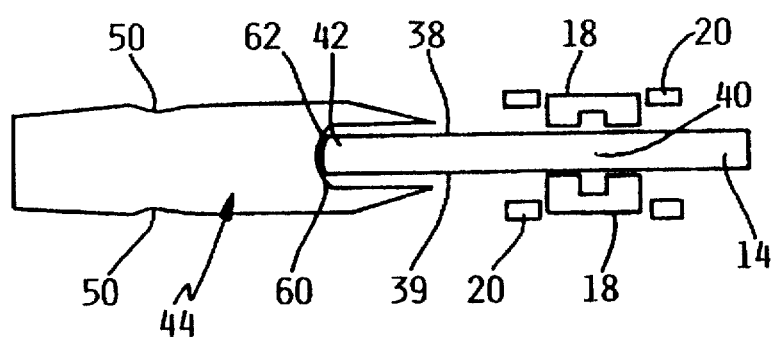
FIG. 4 is a side view illustrating a motion limiter incorporated in a load/unload ramp.

Referring now to FIG. 4, an enlarged view of load/unload ramp 44 is shown in side view. Load/unload ramp 44 incorporates a motion limiter formed by faces 60 and 62. Face 60 is disposed in close proximity to and confronting surface 39 of data storage disk 14 adjacent peripheral portion 42. Likewise, face 62 is disposed in close proximity to and confronting surface 38 of data storage disk 14 adjacent peripheral portion 42. When DASD 10 is subjected to an acceleration, data storage disk 14 contacts at least one of faces 60 and 62 only at the peripheral portion 42, outside data zone 40.

Figure 5:
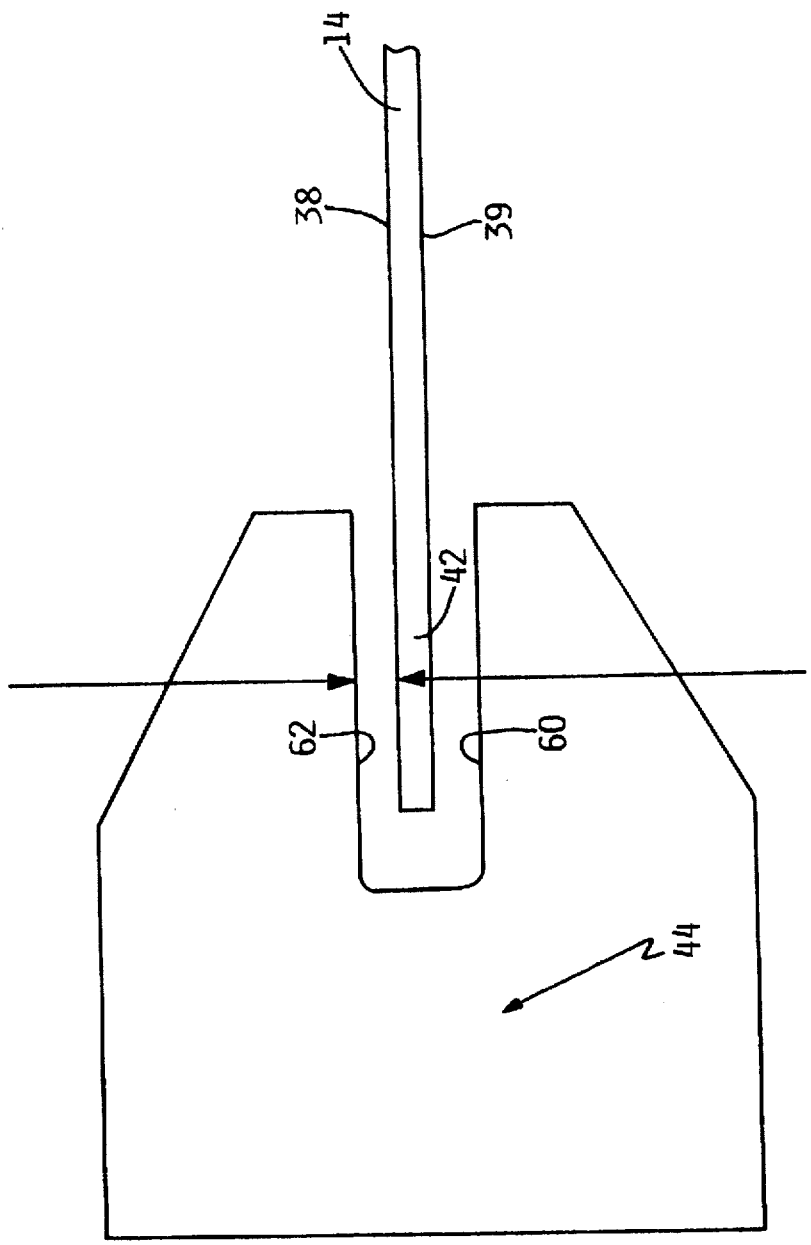
FIG. 5 is a side view illustrating a modified motion limiter incorporated in a load/unload ramp.

As shown in FIG. 4, faces 60 and 62 may respectively confront chamfers formed in surfaces 39 and 38 of data storage disk 14. Alternatively, as shown in FIG. 5, faces 60 and 62 may respectively confront surfaces 39 and 38 of data storage disk 14 without chamfers. Accordingly, as shown in FIG. 5, faces 60 and 62 of ramp 44 are made parallel to surfaces 39 and 38 of data storage disk 14. As data storage disk 14 deflects upon acceleration, it begins to have some slope, so only peripheral portion 42, which is not used for data storage, will contact faces 60 and 62 of ramp 44.

Although ramp 44 is shown mounted to base 12, ramp 44 may instead be mounted to the cover 58. Alternatively, load/unload ramp 44 may be divided into two parts, a first part that includes face 60 may be attached to base 12 and a second part that includes face 62 may be attached to cover 58.

As an alternative to incorporating a motion limiter in load/unload ramp 44, a motion limiter identical to motion limiter 48 may be disposed adjacent load/unload ramp 44 outside position E, so as not to restrict the motion of load beam 20.

The motion limiter incorporated in ramp 44 and motion limiter 48 prevent data storage disk 14 from hitting actuator arm 22 because the clearance between surfaces 38 and 39 of data storage disk 14 and faces 55, 57, 60 and 62 of the motion limiters is less than the clearance between surfaces 38 and 39 of data storage disk 14 and each of load beam 20 and actuator arm 22. By minimizing the span between motion limiter 48 and the motion limiter incorporated in ramp 44 to just outside the travel of actuator 26, the maximum g level protection is provided.

Preferably, faces 60 and 62 of ramp 44 are made of the same material as ramp 44. Accordingly, only an extra molded detail is required, and the cost will not increase. Also preferably, face 54 of base boss 55 and face 57 of cover boss 56 are made of a polymer material, more preferably having a hardness of at least 60 durometers. Still more preferably, the material of faces 55, 57, 60 and 62 are chosen to be sacrificial to the data storage disk 14, i.e., softer than the material of surfaces 38 and 39 of data storage disk 14. Even though faces 55, 57, 60 and 62 are intended to hit data storage disk 14 outside data zone 40, it is still desired to do the least amount of damage to data storage disk 14. Debris formation is avoided by using a polymer material to form ramp 44 and bosses 54 and 56.

Referring back to FIG. 1, a second embodiment of the present invention incorporates motion limiters in each side rail 64 of PCMCIA DASD 10. The data storage disk 14 is received in a cutout 66 in each side rail 64. The motion limiters in side rails 64 may be used alone, or in combination with the motion limiters described in other embodiments of the present invention.

Figure 6:
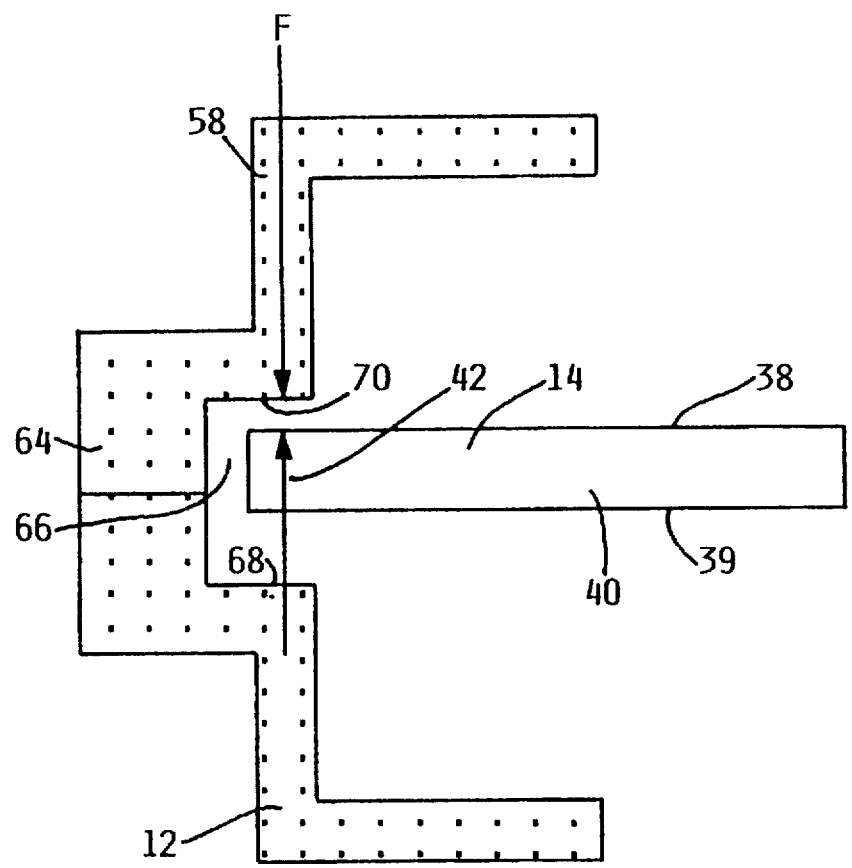
FIG. 6 is a side view illustrating a motion limiter incorporated in a side rail of the PCMCIA DASD shown in FIG. 1.

FIG. 6 shows a side view of a motion limiter incorporated in side rail 64. Cutout 66 includes faces 68 and 70 that respectively project from base 12 and cover 58. Faces 68 and 70 are respectively parallel to surfaces 39 and 38 of data storage disk 14. Base 68 is disposed in close proximity to and confronting surface 39 of data storage disk 14 adjacent peripheral portion 42. Likewise, base 70 is disposed in close proximity to and confronting surface 38 of data storage disk 14 adjacent peripheral portion 42. When PCMCIA DASD 10 is subjected to an acceleration, the data storage disk 14 contacts at least one of faces 68 and 70 only at peripheral portion 42, outside data zone 40.

A clearance F between face 70 and surface 38 of data storage disk 14 may be 0.33 mm, for example. An identical clearance is provided between face 68 and surface 39 of data storage disk 14. This clearance is somewhat less than the expected deflection of data storage disk 14 when subjected to acceleration.

Experiments and analysis by the inventors indicate that a 1.8-inch disk can undergo more than 0.7 mm deflection in a typical tumbling near-flat drop. This deflection is a substantial amount in a PCMCIA DASD where height allocation is very tight. Disk thicknesses are expected to decrease to provide some relief to the height concerns, however, thinner disks would undergo deflections that are larger than a similar disk having a thickness of 25 mil. For example, a disk having a thickness of 15 mil would undergo deflections that are nearly three times as large as a similar disk having a thickness of 25 mil. Thus, this problem becomes much more severe as disk thickness decreases.

Using the motion limiters incorporated in side rails 64 in combination with the motion limiters described in the first embodiment, not only protects data zone 40 of data storage disk 14 from impacting each of load beam 20 and actuator arm 22, but also helps protect the spindle bearings from mechanical shock damage. The latter effect occurs because the motion limiters are disposed about a substantial portion of the circumference of data storage disk 14. However, even with the motion limiters of the first and second embodiments, in combination, it is preferable to provide additional disk motion restraint because one of the lowest frequency modes of data storage disk 14 may produce substantial disk motion in the unrestrained area between side rails 64.

The lowest natural frequency mode of data storage disk 14 is a mode with a single nodal diameter, ie. a diametrical line through and including hub 16, which undergoes no motion. Off this nodal diameter, the disk "flaps" like a bird, but with one wing up while the other wing is down. If a shock force is applied to DASD 10, the nodal diameter will be along a line roughly perpendicular to the line connecting the force and the center of data storage disk 14. It is possible to excite data storage disk 14 in a mode which has a nodal line in any orientation. Therefore, to more fully protect data storage disk 14 and limit the energy transferred to the spindle bearings, it is desirable to limit the motion of data storage disk 14 at many points around the periphery of data storage disk 14.

Referring back to FIG. 1. in the third embodiment, a motion limiter 72 is incorporated between side rails 64 diametrically opposite from actuator 26, in addition to the motion limiters of the first and second embodiments. Motion limiter 72 is identical to motion limiter 48 of the first embodiment. Plural motion limiters 72 may be incorporated as desired.

Figure 7:
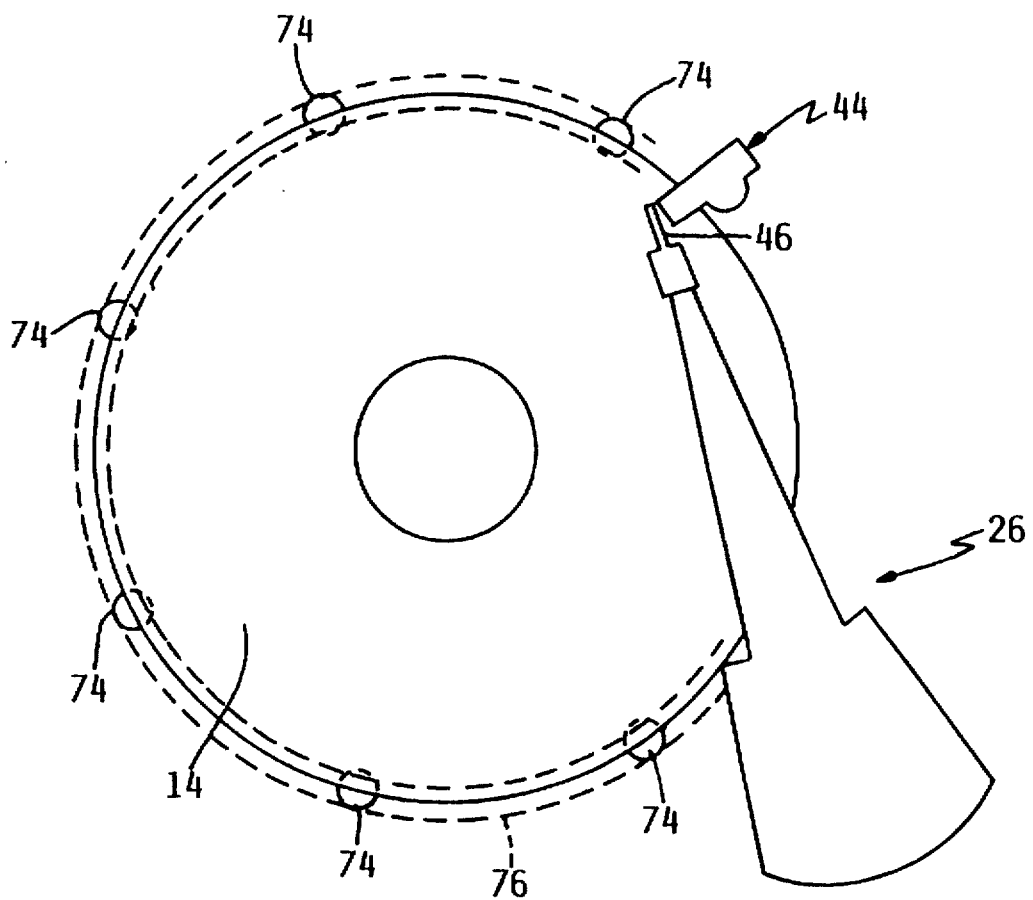
FIG. 7 is a top view illustrating a continuous motion limiter and several discrete motion limiters arranged around a substantial portion of a data storage disk periphery.

In FIG. 7, a fourth embodiment of the present invention is illustrated. Several motion limiters 74, e.g., at least three, are disposed around the periphery of data storage disk 14 are outside the range of motion of actuator 26. Preferably, there are at least six motion limiters 74 at equally spaced points around the periphery of data storage disk 14. Motion limiters 74 are identical to motion limiter 48 of the first embodiment. Also, a motion limiter is preferably incorporated in load/unload ramp 44, as in the first embodiment.

Alternatively, a continuous motion limiter 76 may be provided around a substantial portion of the periphery of data storage disk 14 to still further limit the motion of data storage disk 14, as shown in FIG. 7. The continuous motion limiter 76 has two faces (only one shown) that are elongated versions of the faces 55 and 57 of motion limiter 48 of the first embodiment. Preferably, the faces of continuous motion limiter 76 extend at least 10 degrees, and more preferably about 270 degrees, about the periphery of data storage disk 14. The continuous motion limiter 76 also has the added benefit of providing air flow control shrouding, which decreases spindle power requirements.

It will be recognized that other modifications and changes may be made to further enhance the shock capacity of PCMCIA DASD 10. For example, the continuous motion limiter 76 may be used in lieu of motion limiters 48, 72 or 74. Also, the hybrid continuous/discrete motion limiter may be used, i.e., wherein one of the cover and base has a continuous face, and the other of the cover and base has discrete faces.

It will be apparent to one of skill in the art that other minor modifications may be made to the subject invention without departing from the scope of the invention as defined by the appended claims.

What is claimed is:

1. A direct access storage device, comprising:
a data storage disk rotatably mounted about an axis and having first and second opposite surfaces, a data zone on at least one of said first and second surfaces, and a peripheral portion on each of said first and second surfaces and outside said data zone;
an actuator for moving a transducer head relative to said data storage disk;
a housing enclosing said data storage disk and said actuator, said housing including a base and a cover;
a plurality of motion limiters affixed to and projecting from said base and cover, each motion limiter affixed to said base having a base boss that includes a first face disposed in close proximity to and confronting said first surface of said data storage disk adjacent said peripheral portion and each motion limiter affixed to said cover having a cover boss that includes a second face disposed in close proximity to and confronting said second surface of said data storage disk adjacent said peripheral portion; and
each of said faces of said motion limiters being disposed relative to said data storage disk so that when said direct access storage device is subjected to a vertical acceleration said data storage disk contacts at least one of said first and second faces of said motion limiters only at said peripheral portion, outside said data zone.

2. The direct access storage device as recited in claim 1, further comprising a motion limiter integrated into a ramp, said ramp engagable by said actuator to load and unload the transducer head onto and from said data storage disk.

3. The direct access storage device as recited in claim 1, wherein:
said data storage disk is relatively rigid.

4. The direct access storage device as recited in claim 1, wherein:
each of said motion limiters comprises a material forming said first and second faces which is softer than said first and second surfaces of said data storage disk.

5. The direct access storage device as recited in claim 4, wherein: said material is a polymer having a hardness of at least 60 durometers.

6. The direct access storage device as recited in claim 1, wherein:
said actuator includes an actuator arm on which the transducer head is operatively attached, said actuator arm extending between said first surface of said data storage disk and one of said base and said cover; and
a clearance between each said first face of said motion limiters and said first surface of said data storage disk is less than a clearance between said actuator arm and said first surface of said data storage disk, thereby preventing said first surface of said storage disk from contacting said actuator arm when said direct access storage device is subjected to said acceleration.

7. The direct access storage device as recited in claim 1, wherein:
a clearance between each said first face of said motion limiters and said first surface of said data storage disk and a clearance between each said second face of said motion limiters and said second surface of said data storage disk are each less than a clearance between said base and said first surface of said data storage disk and a clearance between said cover and second surface of said data storage disk, thereby preventing said data zone of said storage disk from contacting said base and said cover when said direct access storage device is subjected to said acceleration.

8. A direct access storage device, comprising:
a data storage disk rotatably mounted about an axis and having first and second opposite surfaces, a data zone on at least one of said first and second surfaces, and a peripheral portion on each of said first and second surfaces and outside said data zone;
a housing enclosing said data storage disk, said housing including a base, a cover and a pair of side rails disposed along parallel sides of said housing, each of said side rails including a cutout into which only said peripheral portion of said data storage disk is received;
a motion limiter integrated within each said cutout of said side rails, each said motion limiter having a first face disposed in close proximity to and confronting only said peripheral portion of said first surface of said data storage disk; and
said first and second faces of each said motion limiter being disposed relative to said data storage disk so that when said direct access storage device is subjected to a vertical acceleration said data storage disk contacts at least one of said first and second faces of each said motion limiter only at said peripheral portion, outside said data zone.

9. The direct access storage device as recited in claim 8, further comprising:

an actuator for moving a transducer head relative to said data storage disk;

a ramp projecting from at least one of said base and cover, said ramp being engagable by said actuator to load and unload the transducer head onto and from said data storage disk;

a second motion limiter integrated into said ramp, said second motion limiter having a first face disposed in close proximity to and confronting said first surface of said data storage disk adjacent said peripheral portion and having a second face disposed in close proximity to and confronting said second surface of said data storage disk adjacent said peripheral portion; and said first and second faces of said second motion limiter being disposed relative to said data storage disk so that when said direct access storage device is subjected to a vertical acceleration said data storage disk contacts at least one of said first and second faces of said second motion limiter only at said peripheral portion, outside said data zone.

10. The direct access storage device as recited claim 9, further comprising:

a projecting motion limiter projecting from of said base and cover, said projecting motion limiter having a first face projecting from said base disposed in close proximity to and confronting said first surface of said data storage disk adjacent said peripheral portion and having a second face projecting from said cover disposed in close proximity to and confronting said second surface of said data storage disk adjacent said peripheral portion;

said first and second faces of said projecting motion limiter being disposed on a first side of a diameter of said data storage disk between said motion limiters integrated within each said cutout of said side rails, and said first and second faces of said second motion limiter being disposed on a second side of said diameter opposite said first side; and said first and second faces of said projecting motion limiter being disposed relative to said data storage disk so that when said direct access storage device is subjected to a vertical acceleration said data storage disk contacts at least one of said first and second faces of said projecting motion limiter only at said peripheral portion, outside said data zone.

11. The direct access storage device as recited in claim 10, wherein:

said projecting motion limiter includes a base boss projecting from said base and a cover boss projecting from said cover, said base boss and said cover boss respectively include said first and second faces of said projecting motion limiter.

12. The direct access storage device as recited in claim 8, wherein:

a clearance between said first face of each said motion limiter integrated within each said cutout of said side rails and said first surface of said data storage disk and a clearance between said second face of each said motion limiter integrated within each said cutout of said side rails and said second surface of said data storage disk are each less than 0.33 millimeters.

13. A direct access storage device, comprising:

a data storage disk rotatably mounted about an axis and having first and second opposite surfaces, a data zone on at least one of said first and second surfaces, and a peripheral portion on each of said first and second surfaces and outside said data zone;

a housing enclosing said data storage disk, said housing including a base and a cover;

a projecting motion limiter projecting from said base and cover, said projecting motion limiter including a base boss projecting from said base having a first face disposed in a close proximity to and confronting said first surface of said data storage disk adjacent said peripheral portion, and said projecting motion limiter further including a cover boss having a second face disposed in close proximity to and confronting said second surface of said data storage disk adjacent said peripheral portion;

said first and second faces of said projecting motion limiter extending at least 180 degrees about the periphery of said data storage disk; and said first and second faces of said projecting motion limiter being disposed relative to said data storage disk so that when said direct access storage device is subjected to vertical acceleration said data storage disk contacts at least one of said first and second faces of said projecting motion limiter only at said peripheral portion, outside said data zone.

14. The direct access storage device as recited in claim 13, further comprising:

an actuator for moving a transducer head relative to said data storage disk;

a ramp projecting from at least one of said base and cover, said ramp being engagable by said actuator to load and unload the transducer head onto and from said data storage disk;

a motion limiter integrated in said ramp, said motion limiter having a first face disposed in close proximity to and confronting said first surface of said data storage disk adjacent said peripheral portion and having a second face disposed in close proximity to and confronting said second surface of said data storage disk adjacent said peripheral portion; and said first and second faces of said motion limiter being disposed relative to said data storage disk so that when said direct access storage device is subjected to an acceleration said data storage disk contacts at least one of said first and second faces of said motion limiter only at said peripheral portion, outside said data zone.

15. The direct access storage device as recited in claim 14, wherein:

said first and second faces of said projecting motion limiter extend continuously about 270 degrees about the periphery of said data storage disk.

* * * * *